(12) United States Patent
Gobbo (10) Patent No.: US 7,465,282 B2
(45) Date of Patent: Dec. 16, 2008

(54) EASY INSTALL HINGE CONNECTION

(75) Inventor: Jeremie Gobbo, Windsor (CA)

(73) Assignee: Schukra of North America, Ltd., Lakeshore-Tecumseh (CA)

( * ) Notice: Subject to any disclaimer, the term of this patent is extended or adjusted under 35 U.S.C. 154(b) by 299 days.

(21) Appl. No.: 11/437,513

(22) Filed: May 18, 2006

(65) Prior Publication Data

US 2007/0270729 A1    Nov. 22, 2007

(51) Int. Cl.
*A61F 5/00* (2006.01)
(52) U.S. Cl. .................. 602/5; 602/16; 602/19
(58) Field of Classification Search .............. 602/5, 602/19, 32–40, 16; 128/845–846, 869–870
See application file for complete search history.

(56) References Cited

U.S. PATENT DOCUMENTS

| | | | |
|---|---|---|---|
| 3,909,886 A | 10/1975 | Hocke | |
| 5,015,023 A | 5/1991 | Hall | |
| 5,130,018 A * | 7/1992 | Tolman et al. | 210/172.5 |
| 5,474,358 A | 12/1995 | Maeyaert | |
| 5,788,328 A | 8/1998 | Lance | |
| 5,791,733 A | 8/1998 | van Hekken et al. | |
| 6,045,185 A | 4/2000 | Ligon, Sr. et al. | |
| 6,158,300 A | 12/2000 | Klingler | |
| 6,843,531 B2 | 1/2005 | Williams | |
| 6,860,559 B2 | 3/2005 | Schuster, Sr. et al. | |
| 2004/0255712 A1 | 12/2004 | Ruhlander | |

FOREIGN PATENT DOCUMENTS

DE    4307861 A1 *  9/1994

* cited by examiner

*Primary Examiner*—Michael A. Brown
(74) *Attorney, Agent, or Firm*—Kang Intellectual Property Law, LLC; Grant D. Kang (57) ABSTRACT

A lever connection comprises a lever having a cable end and a spring end and a pivot point therebetween, and a cable having a cable end fitting attached to an end thereof. The cable end fitting comprises a cable clamp and a frame, the cable clamp being adapted for attachment of the end fitting to the cable, the frame comprising first and second side members, a top member, and a bottom member. The top member is adjacent to the cable clamp and the frame defines an orifice between the first and second side members and the top and bottom members, the side members having a distance therebetween. The cable end of the lever comprises a bearing being sized for insertion through the orifice of the end fitting and adapted for engagement with the bottom member of the frame of the end fitting.

7 Claims, 9 Drawing Sheets

Prior Art

EASY INSTALL HINGE CONNECTION

TECHNICAL FIELD OF THE INVENTION

The present invention relates to ergonomic support devices for seats, particularly lumbar supports, and, more particularly, to an improved hinge connection for an adjustment cable in a lumbar support.

DESCRIPTION OF THE RELATED ART

Powered lumbar support devices intended for use in automobile seat backs typically include a panel that has a first end and a second end and is biased in a forward direction for providing an arch in the seat back. A series of adjustment cables, sometimes referred to as "Bowden" cables and driven by motorized gear boxes, control and change the distance between the first end and the second end of the panel. By changing the distance between the first end and the second end, the arch in the panel is changed for adjusting the amount of lumbar support.

As described in U.S. Pat. No. 6,631,951, the comfort of these lumbar supports can be enhanced by use of a compliant spring connected to one of the ends of the panel and with the appropriate adjustment cable. The compliant spring includes a contracting spring force that is greater than the extending force generated by the drive mechanism for the cable. When the panel is subjected to enough force to overcome the contracting spring force of the compliant spring, the compliant spring stretches, increasing the distance between the first end and the second end, changing the arch in the panel. The compliance provided to the panel by the resilient spring provides an additional level of comfort to the seat occupant.

The compliant spring is often coupled to the adjustment cable by means of a pivoting lever. A fitting on the end of the adjustment cable engages the pivoting lever. The most common fitting type in general use is a "Z-shaped" fitting that must be inserted into a hole within the lever. These fittings require significant manipulation of the fitting and lever for assembly and often result in a connection that is noisy and may produce significant vibration within the support during movement of the adjustment cable and lever.

Therefore, it would be advantageous to provide a hinge connection for a lumbar support that may be assembled with ease and produces less noise and vibration during movement of the support.

The present invention is directed to overcoming one or more of the problems set forth above.

SUMMARY OF THE INVENTION

It is in view of the above problems that the present invention was developed. The present invention overcomes many of the disadvantages associated with prior art cable/lever connections for lumbar supports by providing a hinge connection capable of straightforward assembly and decrease vibration during use.

In one aspect the invention is a lever connection comprising a lever having a cable end and a spring end and a pivot point therebetween, and a cable having a cable end fitting attached to an end thereof. The cable end fitting comprises a cable clamp and a frame, the cable clamp being adapted for attachment of the end fitting to the cable, the frame comprising first and second side members, a top member, and a bottom member. The top member is adjacent to the cable clamp and the frame defines an orifice between the first and second side members and the top and bottom members, the side members having a distance therebetween. The cable end of the lever comprises a bearing being sized for insertion through the orifice of the end fitting and adapted for engagement with the bottom member of the frame of the end fitting.

In another aspect the invention is a lever connection for a lumbar support device, comprising a lever having a cable end and a spring end and a pivot point therebetween, and a cable having a cable end fitting attached to an end thereof. The cable end fitting comprises a cable clamp and a frame, the cable clamp being adapted for attachment of the end fitting to the cable. The frame comprises first and second side members, a top member, and a bottom member, the top member being adjacent to the cable clamp. The frame defines an orifice between the first and second side members and the top and bottom members, the side members having a distance therebetween. The cable end of the lever comprises a bearing being sized for insertion through the orifice of the end fitting and adapted for engagement with the bottom member of the frame of the end fitting. The bearing comprises a curved structure along a side of the lever at the cable end of the lever, the curved structure having a concave interior profile. The bottom member of the frame of the cable end fitting has a cylindrical profile and the bearing has a semicircular opening that matingly engages with the cylindrical profile of the bottom member of the frame of the cable end fitting. The spring end of the lever is operably attached to a spring. The lever is flat and has a thickness, wherein the thickness is smaller than the distance between the side members of the frame of the cable end fitting.

In still another aspect the invention is a cable connector and bearing system for a lumbar support device, comprising a cable with an eye-shaped connector attached to an end of the cable, the connector having a proximal end attached to the cable and a distal end, the distal end being linked to the proximal end by a pair of parallel side portions. A central portion of the distal end comprises an approximately cylindrical shape. The system also comprises a bearing to which the eye-shaped connector of the cable attaches, the bearing itself comprising a concave curve having a profile complementary to the cylindrical shape of the distal end of the connector, the bearing being sized to fit into the connector.

These aspects are merely illustrative of the innumerable aspects associated with the present invention and should not be deemed as limiting in any manner. These and other aspects, features and advantages of the present invention will become apparent from the following detailed description when taken in conjunction with the referenced drawings.

BRIEF DESCRIPTION OF THE DRAWINGS

Reference is now made more particularly to the drawings, which illustrate the best presently known mode of carrying out the invention and wherein similar reference characters indicate the same parts throughout the views.

DETAILED DESCRIPTION

In the following detailed description numerous specific details are set forth in order to provide a thorough understanding of the invention. However, it will be understood by those skilled in the art that the present invention may be practiced without these specific details. For example, the invention is not limited in scope to the particular type of industry application depicted in the figures. In other instances, well-known methods, procedures, and components have not been described in detail so as not to obscure the present invention.

Figure 1:
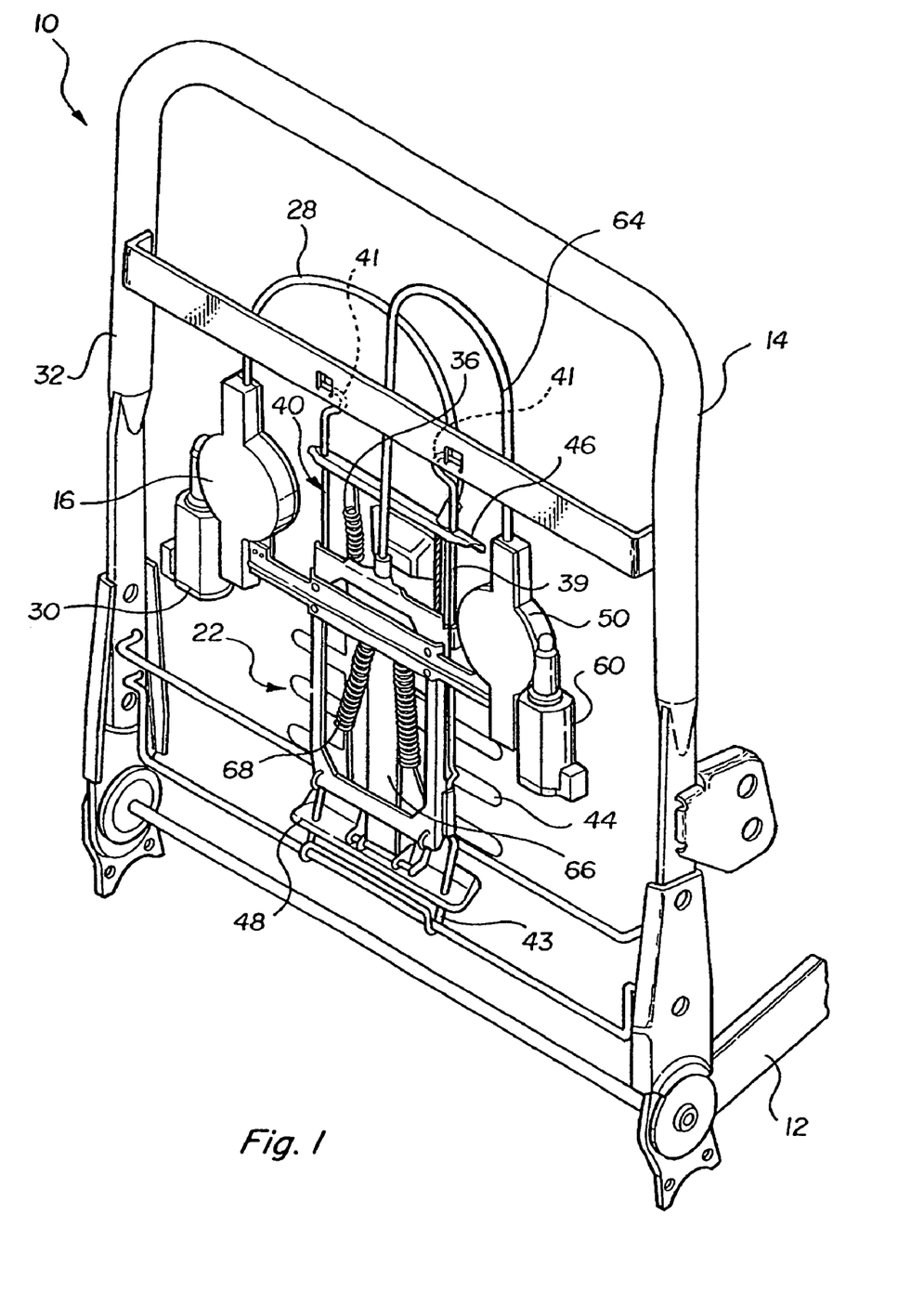
FIG. 1 is a perspective view of a lumbar support incorporating a hinge connection according to an embodiment of the present invention.

An embodiment of an automotive seat frame 10 is illustrated in FIG. 1. The frame 10 includes a seat section 12 and back section 14. The back section 14 has a ring 32 defining the perimeter of the back section 14. An embodiment of a powered lumbar support device 22, which may be mounted to seat frame 10, has a lumbar frame 40 with a plurality of hooks 41 at one end and a clasp 43 at the other. The lumbar frame 40 is fixedly attached to the ring 32 by the hooks 41 and the clasp 43. A panel 44 is slidably disposed generally upon the vertical members 39 of the lumbar frame 40. The panel 44 has a first end 46 and a second end 48 moveable relative to one another for forming an arch in the panel 44.

Figure 4:
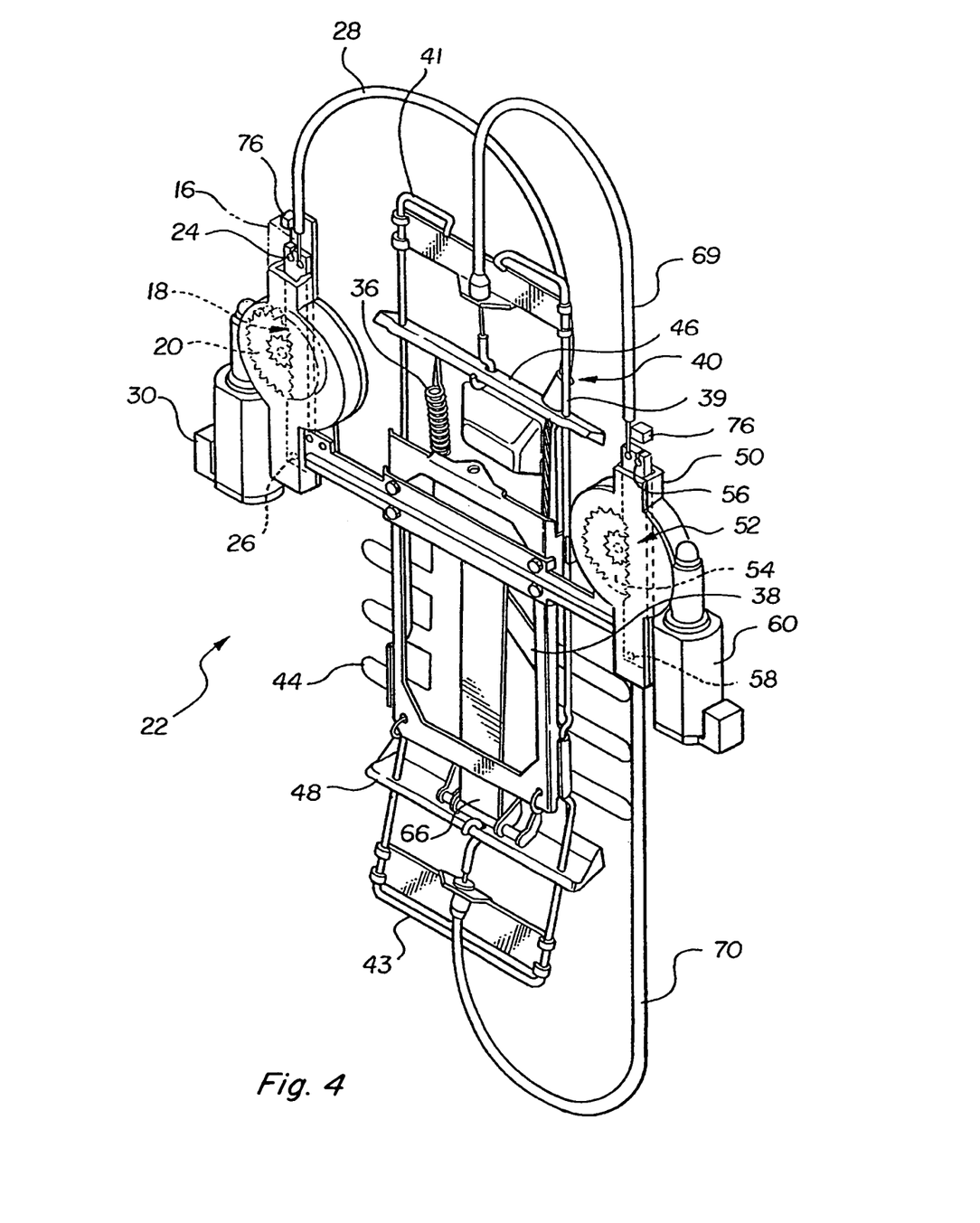
FIG. 4 is a perspective view, showing a lumbar support incorporating a hinge connection according to one embodiment of the present invention.
Figure 5:
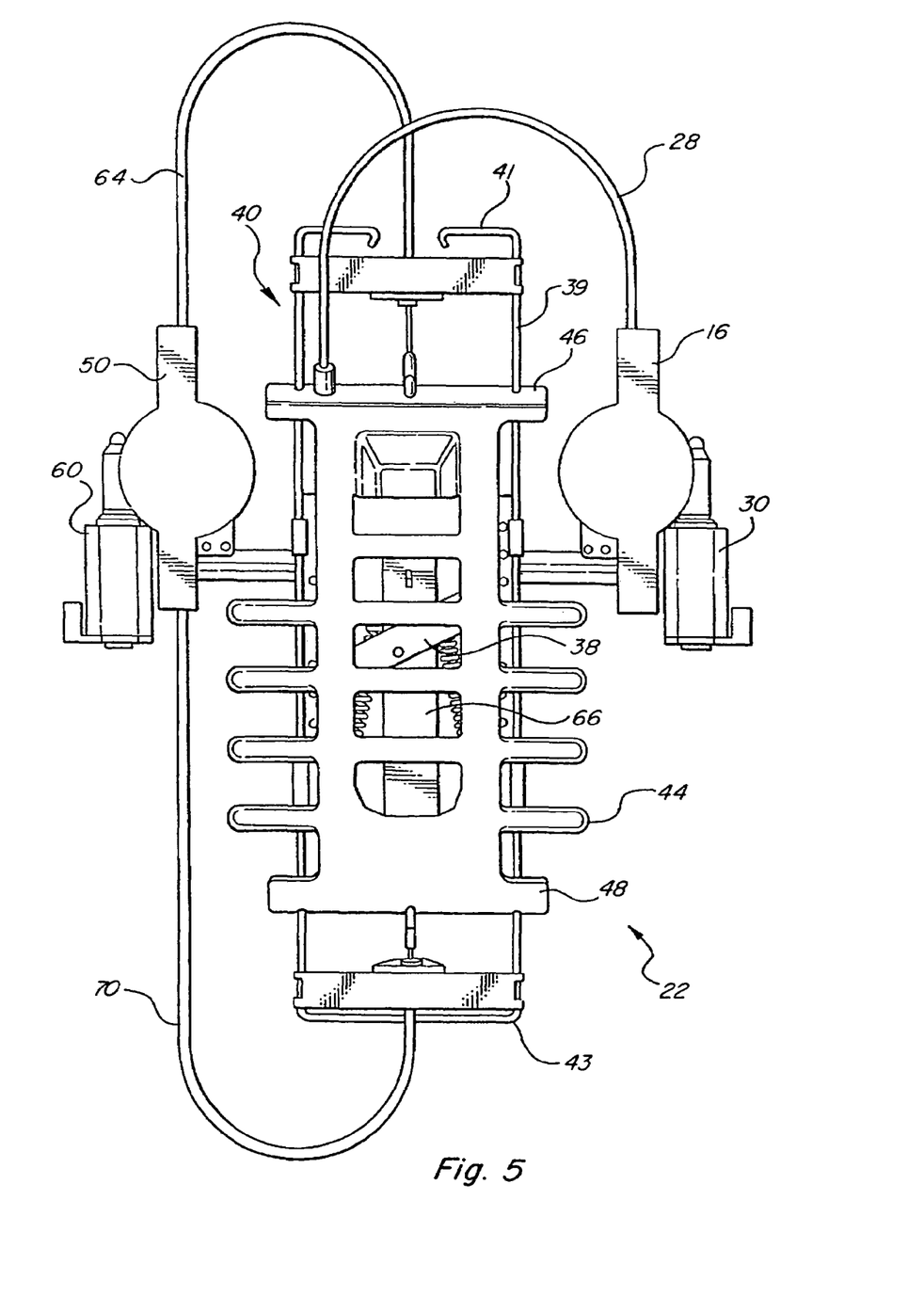
FIG. 5 is a front view of a lumbar support incorporating a hinge connection according to one embodiment of the present invention.
Figure 6:
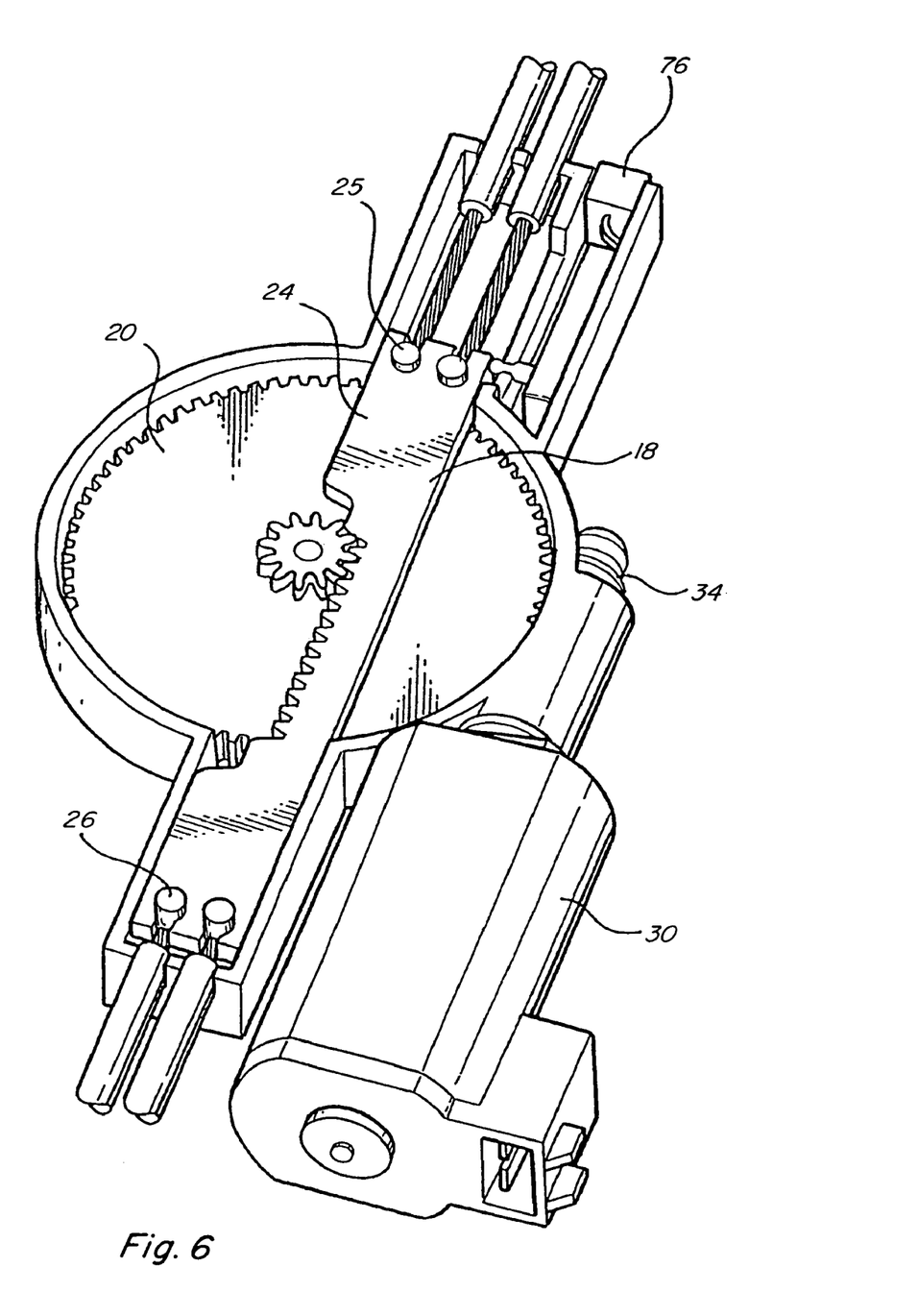
FIG. 6 is a perspective view of a gear box of a type used in the lumbar supports shown in FIGS. 1-5.

A first gear box 16, best shown in FIG. 6, is attached to the lumbar frame 40, as shown in FIGS. 1-5. The first gear box 16 has an arching rack 18 and an arching pinion 20. The arching rack 18 includes a first arching end 24 and a second arching end 26. Each of the first and the second arching ends 24, 26 are adapted to allow the attachment of cables thereto. More specifically, at least one connector 25 is disposed in each of the first and second arching ends 24, 26 for receiving an end of a cable. The connector 25 is represented as a slot having a keyhole shape for receiving the end of the cable. However, the connector 25 is not limited to a slot and may include any means of fixing the cable to the rack as is known in the art. In the preferred embodiment, there are two connectors disposed in each of the arching ends 24, 26 and the connector is an aperture for receiving the end of the cable.

A first cable 28 is connected between the arching rack 18 and one of the ends 46, 48 of the panel 44. The arching rack 18 moves in a linear direction transferring motion through the first cable 28 causing the end of panel 44 to move. Movement of the two ends 46, 48 of panel 44 towards each other changes the magnitude of the arch, thereby providing additional lumbar support to the seat occupant. A first motor 30 operatively engages the first gear box 16 with a worm 34 to transfer linear movement to the arching rack 18 (FIG. 6). The worm 34 is in driving engagement with arching pinion 20, enabling arching pinion 20 to impart linear movement to arching rack 18. The first motor 30 is shown generally in FIGS. 5 and 6 as receiving cables in both ends of the rack, the purpose of which will be described below. A memory device 76 is disposed within the first gear box enabling a predetermined position of the arching rack 18 corresponding to a predetermined magnitude in the arch of the panel 44 to be stored in a controller (not shown). The memory device 76 may be any known device capable of determining the location of the rack 18 and enabling the position of the rack 18 to be stored for returning the rack 18 to that same position when desired. For example, one such device is a memory potentiometer.

The lumbar support device 22 further includes a compliant spring 36 interposed between one of the ends 46, 48 of the panel 44 and the first cable 28. The compliant spring 36 transfers movement from the first cable 28 to one of the ends 46, 48 of the panel 44. The compliant spring 36 has an expansion force stronger than the linear force generated by the first motor 30. Therefore, when the first motor 30 is operated, the ends 46, 48 of the panel 44 move without stretching the compliant spring 36. A lever 38 operably connects the first cable 28 to the compliant spring 36. Tension (arrow 29 in FIG. 12) applied to first cable 28 causes pivoting movement of lever 38 (double-headed, curved arrow 71 in FIG. 12).

Figure 2:
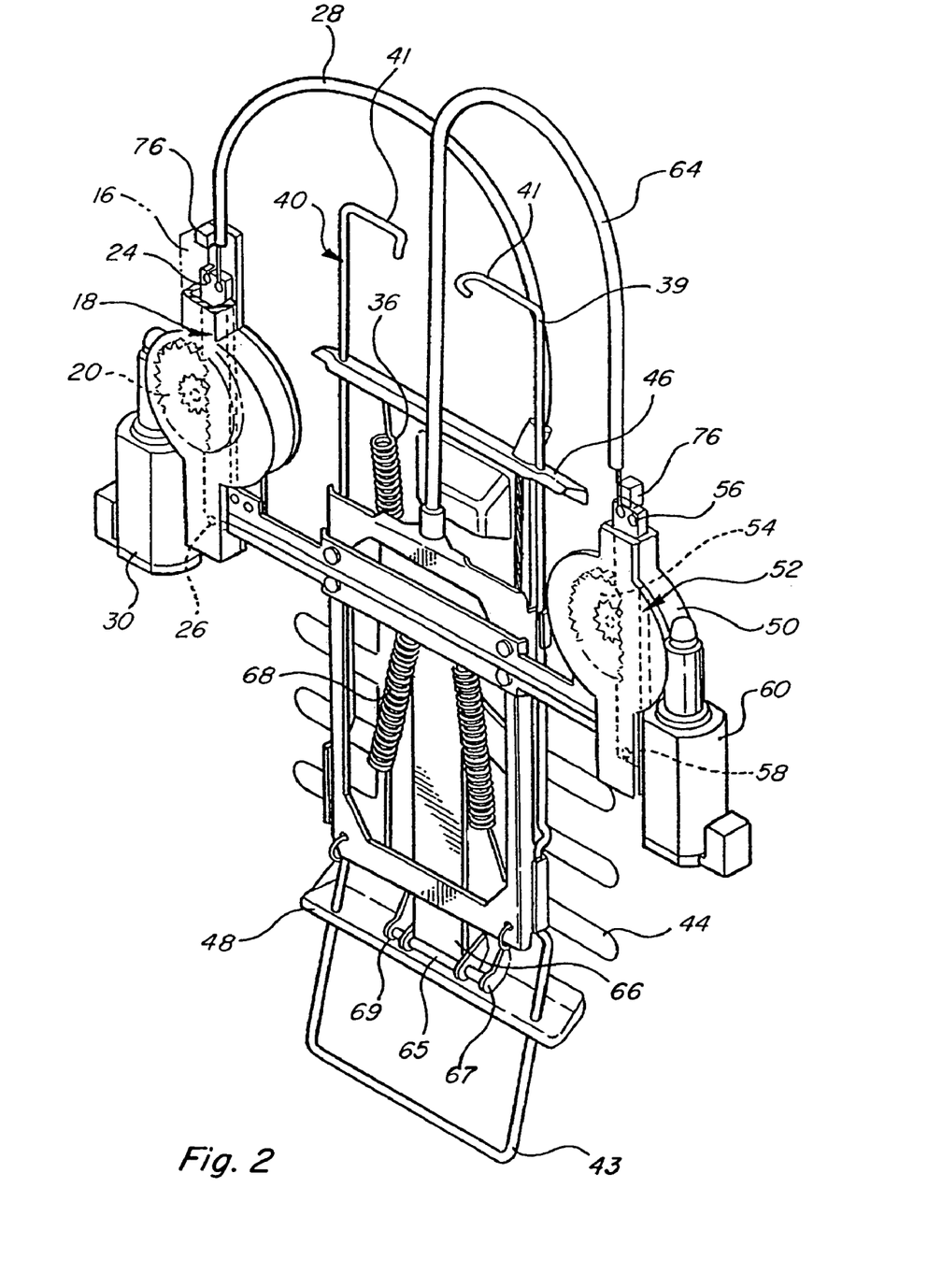
FIG. 2 is a front view of another lumbar support incorporating a hinge connection according to an embodiment of the present invention.
Figure 3:
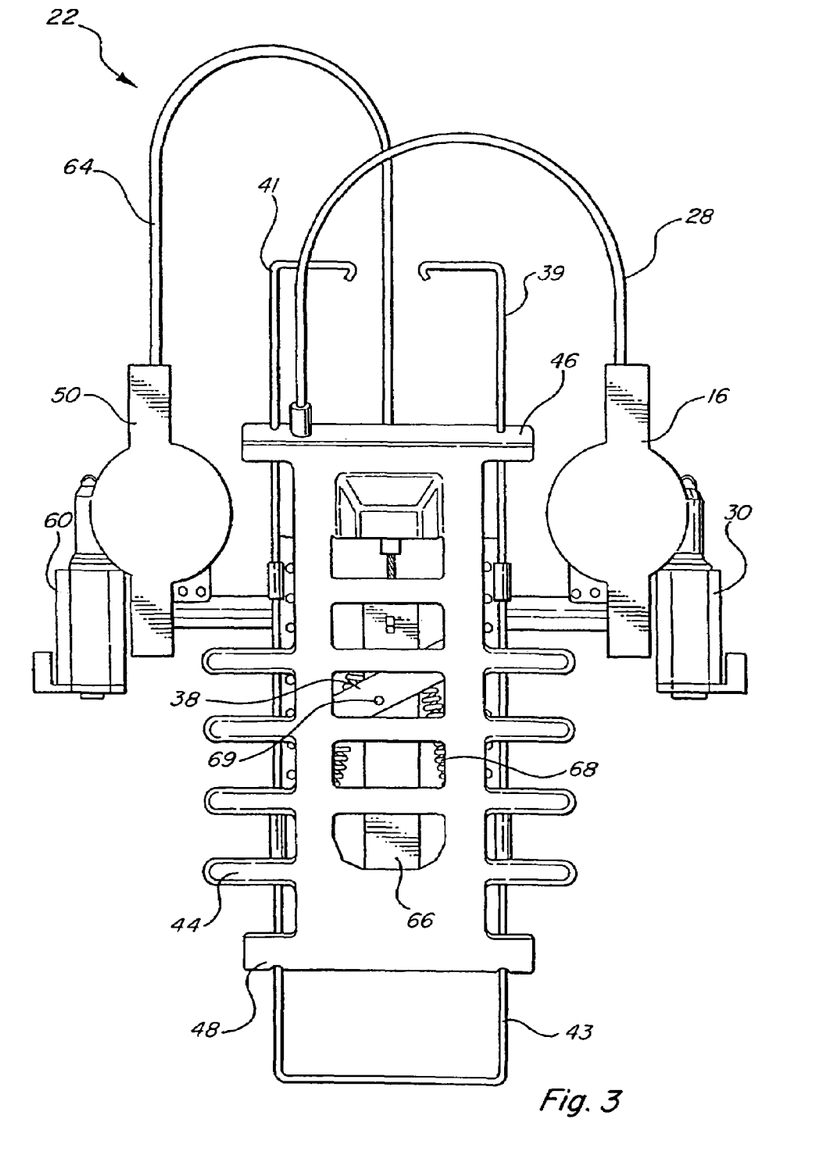
FIG. 3 is a front view of the lumbar support of FIG. 2.

A support member 66 is connected to one of the panel ends 46, 48 with a pin 65 inserted through opposing tabs 67 allowing pivotal movement of the member 66 relative to the ends 46, 48 (FIG. 2). In one embodiment the lever 38 is pivotally supported on the support member 66 by a pin 69, allowing pivoting movement of the lever 38 relative to the support member 66. The lever 38 is moved in response to movement of first cable 28 thereby transferring movement from the cable through the lever 38 to one of the ends 46, 48 of the panel 44. The movement of one of the panel ends 46, 48 causes the magnitude of the arch of the panel 44 to increase or decrease.

The compliant spring 36 allows the arch to flex when an outside force, such as from a passenger sitting in the seat, is exerted against the arch. The force generated by the first motor 30 is not capable of overcoming the contracting spring force of the compliant spring 36. However, the combination of forces generated by the spring 36 and the motor 30 provide enough counter force to the compliant spring 36 to overcome the contracting spring force of the compliant spring 36 when a predetermined force is exerted upon the panel 44 by a seat occupant. This provides the panel 44 with a compliant feature that increase the level of comfort to the seat occupant by softening the lumbar support provided by the panel 44.

Figure 7:
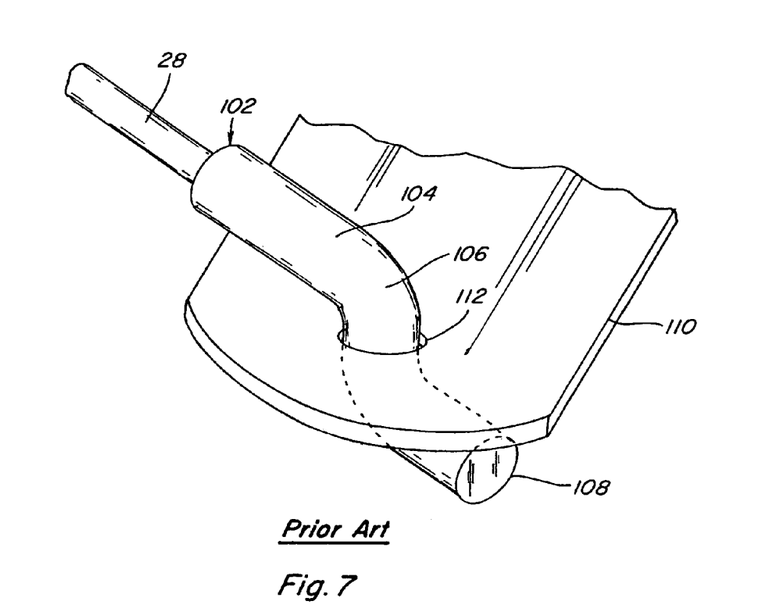
FIG. 7 is a perspective view of a prior art connection for a lumbar support.

FIG. 7 illustrates a prior art apparatus for this connection. In the prior art, a "Z-shaped" fitting 102 is attached to the free end of first cable 28 by known means such as crimping, welding, or other suitable methods. Prior art fitting 102 is generally cylindrical in its cross-sectional shape with a constant diameter. The fitting 102 includes a top section 104, a transitional section 106, and a bottom section 108. The transitional section 106 includes two opposing bends of approximately ninety degrees (90°) separated by a middle portion. The middle portion is oriented approximately perpendicular to the top 104 and bottom 108 sections of the fitting 102 and the first cable 28. One end of lever 110 is provided with a hole 112. Hole 112 has an inside diameter somewhat larger than the outside diameter of fitting 102. To connect first cable 28 with lever 110, bottom section 108 is first inserted through hole 112. Fitting 102 must then be manipulated to guide the ninety degree bend adjacent the bottom section 108 through hole 112. The middle portion of transitional section 106 is then positioned within hole 112 such that the two ninety degree bends of the transitional section 106 are positioned on either side of lever 110, loosely securing fitting 102 in engagement with lever 110. This procedure of guiding Z-shaped fitting 102 into hole 112 is time-consuming and thus costly. The device of the present application simplifies this step of the assembly process, as described below.

Figures 8, 9:
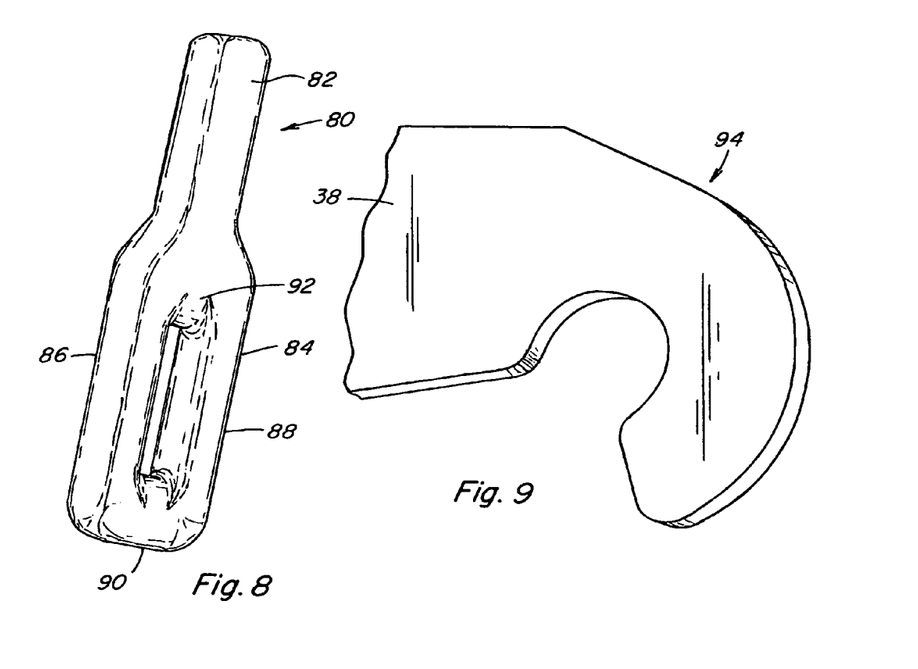
FIG. 8 is a perspective view of a fitting for a hinge connection according to an embodiment.
FIG. 9 is a perspective view of a bearing for a hinge connection according to an embodiment.
Figure 10:
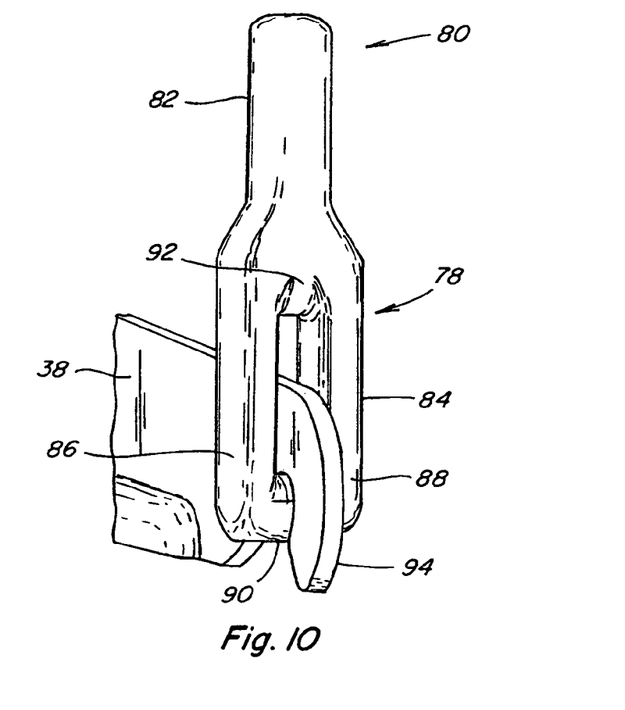
FIG. 10 is a perspective view of one embodiment of an assembled hinge connection.
Figure 11:
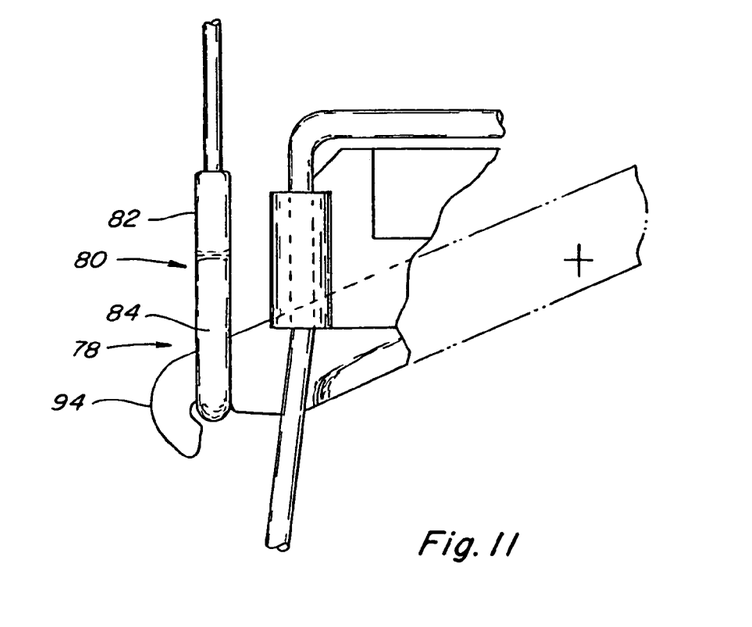
FIG. 11 is a front view of one embodiment of an assembled hinge connection.

As shown in FIGS. 10 and 11, a lever 38 operably connects the first cable 28 to the compliant spring 36 by means of a hinge connection 78 formed from a fitting 80 (FIG. 8) and bearing 94 (FIG. 9). This rotatable connection is generally accomplished by means of an end fitting attached to the free end of first cable 28 that is adapted to securably engage one end of lever 38.

Figure 12:
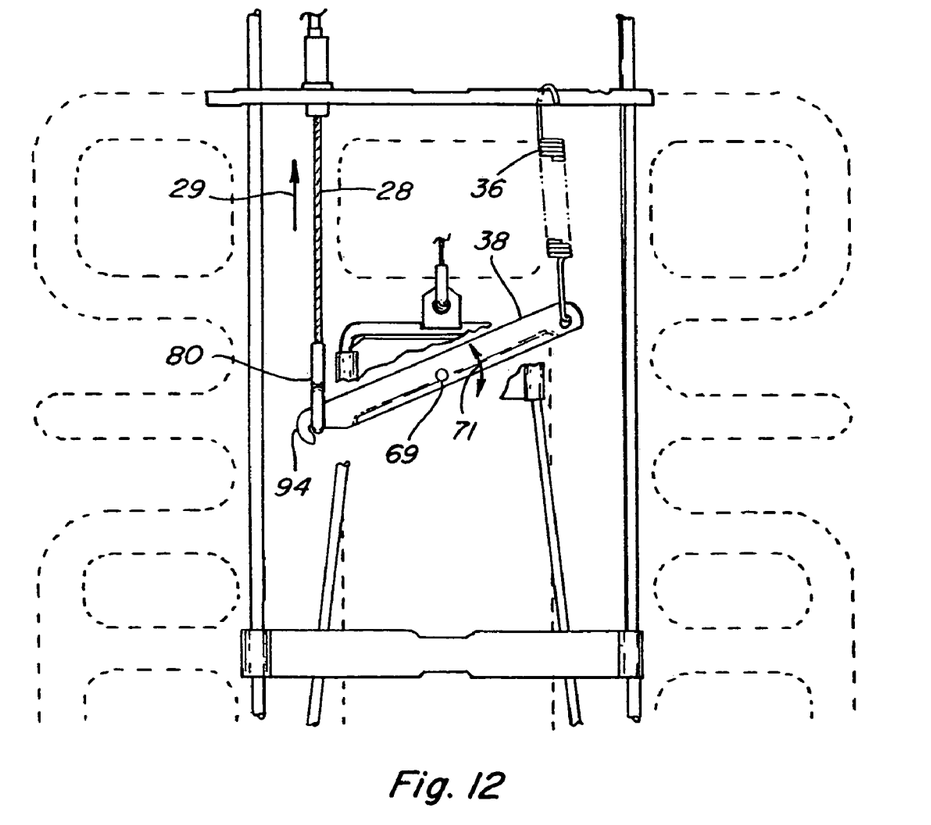
FIG. 12 shows a hinge connection as employed in a lumbar support mechanism.

According to the preferred embodiment, fitting 80 is attached to the free end of first cable 28 (FIGS. 11 and 12). Fitting 80 is generally in the shape of an "eye", that is, it is provided with a top section 82 and an elongated, O-shaped section 84 (FIG. 8). The top section 82, or cable clamp portion, of fitting 80 is preferably provided with a central opening along its axis into which the free end of first cable 28 is inserted. Fitting 80 may be secured to the free end of cable 28 by crimping, welding, or any other suitable method, or it may be molded directly onto the cable. Those of skill in the art will recognize that a multitude of suitable attachment methods are known in the art and that the particular method of attaching fitting 80 to first cable 28 is not critical to the invention, provided that the connection is sufficiently strong for the intended purpose. The elongated, O-shaped section 84, or frame portion of the cable end fitting, includes first and second parallel sides 86, 88, a bottom 90 (or distal portion), and a top 92 (or proximal portion). In the preferred embodiment, the bottom 90 of the elongated, O-shaped section 84 has a cylindrical cross-section and is provided with a rounded interior surface, while the interior surfaces of first and second parallel sides 86, 88 are generally flat. Fitting 80 is preferably manufactured as a single, cast or molded piece, and may be made from any suitable, rigid material. Bearing 94 may be part of any component to which fitting 80 needs to be attached, although bearing 94 is preferably part of lever 38. Bearing 94 may be made of any suitable, rigid material such as metal and its shape may be introduced into the material through known, conventional means such as molding, stamping, cutting, grinding, or the like.

The distance between the parallel sides 86, 88 of fitting 80 is preferably slightly larger than the thickness of lever 38 to permit ready insertion of the lever 38 through the O-shaped section 84 and smooth movement of lever 38 relative to fitting 80, while minimizing lateral movement of fitting 80 relative to lever 38 after assembly.

In the preferred embodiment, lever 38 is provided with a mating end having a roughly J-shaped, or hook-shaped, bearing 94 for engagement with fitting 80. Bearing 94 is adapted for insertion through the center of elongated, O-shaped section 84 and engagement with the bottom 90 of fitting 80. The interior of the bearing 94 preferably forms a roughly semicircular surface having a radius generally equivalent and complementary to the radius of the bottom 90 of fitting 80, thereby providing for a solid engagement between the two pieces which allows for smooth rotational movement between the two pieces. The open side of the bearing 94 is advantageously of sufficient size to accommodate the full diameter of the bottom 90 of fitting 80 to allow it access to the interior of bearing 94. More generally, bearing 94 comprises an upwardly sloped surface leading to a curved end, at one end of lever 38, of which the disclosed embodiment is but one example.

As is readily apparent, the design of the fitting 80 and bearing 94 significantly enhances the ease of assembling lumbar support 10. While the prior art fitting and lever combination requires significant manipulation of the constituent parts to assemble, the bearing of the present invention may be simply inserted through the fitting and lowered into engagement with the bottom of the fitting to secure the two pieces together. Significantly, the design of the present invention also reduces thrust face contact and increases reaction moments of the fitting compared to the prior art, thereby reducing the amplitude of vibration in the fitting as it rotates in the bearing. This is particularly important as the interaction between fitting 80 and bearing 94 is under tension and subject to continuous movement while the seat occupant is resting against lumbar support 10. In the absence of a smooth interaction between fitting 80 and bearing 94, the seat occupant may feel vibrations and hear noise arising from the movement of the cable end relative to the lever.

The lumbar support device 22 may also include a second gear box 50 having a moving rack 52 and a moving pinion 54 attached to the lumbar frame 40, as shown in FIGS. 2 and 4. The moving rack 52 has a first moving end 56 and a second moving end 58 with each of the moving ends having at least one connector disposed therein. A second motor 60 having a worm 34 extending from the second motor 60 directly engages the second gear box 50. The second motor 60 and the second gear box 50 operate in the same manner as the first motor 30 and the first gear box 16. A second cable 64 is connected between one of the connectors of the moving rack 52 and the support member 66. The second cable 64 transfers linear movement of the moving rack 52 to the panel 44 for vertically shifting the panel 44. This moves the lumbar support 22 in the seat back in a generally vertical direction to accommodate various height and comfort preferences of the seat occupant.

At least one shifting spring 68 is attached between one of the ends 46, 48 of the panel 44 and the lumbar frame 40, shown in FIGS. 1 and 2. When the panel 44 is shifted in a vertical direction by the second cable 64, the contraction force of the shifting spring 68 is overcome, thereby stretching the shifting spring 68. When the second motor 60 is not actually shifting the panel 44, the shifting spring 68 contracts, returning the panel 44 to the original position. In the preferred embodiment, two springs are attached to the frame 10 and the panel 44, as shown in FIGS. 1 and 2. However, it would be readily apparent to one skilled in the art that one spring 32 having a larger force could be used in place of the two springs.

In a third embodiment of the powered lumbar support device 22, shown in FIGS. 4 and 5, the shifting spring 68 may be replaced by a third cable 70. The third cable 70 is connected to the opposite end of the moving rack 52 from the second cable 64 (FIG. 4). Therefore, if the second cable 64 is connected to the first moving end 56 of the moving rack 52 and the third cable 70 is connected to the second moving end 58, the second and third cable 64, 70 shift the panel 44 vertically. When the rack 52 moves downward, the second cable 64 shifts the panel 44 upward. When the rack 52 moves upward, the third cable 70 shifts the panel 44 downward.

The preferred embodiment of the invention has been described above to explain the principles of the invention and its practical application to thereby enable others skilled in the art to utilize the invention in the best mode known to the inventors. However, as various modifications could be made in the constructions and methods herein described and illustrated without departing from the scope of the invention, it is intended that all matter contained in the foregoing description or shown in the accompanying drawings shall be interpreted as illustrative rather than limiting. Thus, the breadth and scope of the present invention should not be limited by the above-described exemplary embodiment, but should be defined only in accordance with the following claims appended hereto and their equivalents.

What is claimed is:

1. A lever connection for a lumbar support device, comprising:

a lever having a cable end and a spring end and a pivot point therebetween;

a cable having a cable end fitting attached to an end thereof;

said cable end fitting comprising a cable clamp and a frame, said cable clamp being adapted for attachment of said end fitting to said cable, said frame comprising first and second side members, a top member, and a bottom member, said top member being adjacent said cable clamp and said frame defining an orifice between said first and second side members and said top and bottom members, said side members having a distance therebetween; and said cable end of said lever comprising a bearing being sized for insertion through said orifice of said end fitting and adapted for engagement with said bottom member of said frame of said end fitting.

2. The lever connection of claim 1 wherein said bearing comprises a curved structure along a side of said lever at said cable end of said lever, said curved structure having a concave interior profile.

3. The lever connection of claim 1 wherein said bottom member of said frame of said cable end fining has a cylindrical profile.

4. The lever connection of claim 3 wherein said bearing has a semicircular opening that matingly engages with said cylindrical profile of said bottom member of said frame of said cable end fining.

5. The lever connection of claim 1 wherein said spring end of said lever is operably attached to a spring.

6. The lever connection of claim 1 wherein said lever is flat and has a thickness, wherein said thickness is smaller than said distance between said side members of said frame of said cable end fitting.

7. A lever connection for a lumbar support device, comprising:

a lever having a cable end and a spring end and a pivot point therebetween;

a cable having a cable end fining attached to an end thereof;

said cable end fitting comprising a cable clamp and a frame, said cable clamp being adapted for attachment of said end fitting to said cable, said frame comprising first and second side members, a top member, and a bottom member, said top member being adjacent said cable clamp and said frame defining an orifice between said first and second side members and said top and bottom members, said side members having a distance therebetween;

said cable end of said lever comprising a bearing being sized for insertion through said orifice of said end fitting and adapted for engagement with the bottom member of said frame of said end fitting, said bearing comprising a curved structure along a side of said lever at said cable end of said lever, said curved structure having a concave interior profile;

said bottom member of said frame of said cable end fitting having a cylindrical profile;

said bearing having a semicircular opening that matingly engages with said cylindrical profile of said bottom member of said frame of said cable end fitting;

said spring end of said lever being operably attached to a spring; and said lever being flat and having a thickness, wherein said thickness is smaller than said distance between said side members of said frame of said cable end fitting.

* * * * *